(12) United States Patent
Gagliardi et al.

(10) Patent No.: US 9,021,448 B1
(45) Date of Patent: Apr. 28, 2015

(54) AUTOMATED PATTERN DETECTION IN SOFTWARE FOR OPTIMAL INSTRUMENTATION

(71) Applicant: CA, Inc., Islandia, NY (US)

(72) Inventors: Marco Gagliardi, Brisbane, CA (US); Andreas Reiss, Frankfurt (DE)

(73) Assignee: CA, Inc., New York, NY (US)

( * ) Notice: Subject to any disclaimer, the term of this patent is extended or adjusted under 35 U.S.C. 154(b) by 99 days.

(21) Appl. No.: 13/780,257

(22) Filed: Feb. 28, 2013

(51) Int. Cl.
*G06F 9/44* (2006.01)
*G06F 11/36* (2006.01)

(52) U.S. Cl.
CPC .............. *G06F 8/70* (2013.01); *G06F 11/3636* (2013.01)

(58) Field of Classification Search
None
See application file for complete search history.

(56) References Cited

U.S. PATENT DOCUMENTS

| | | | | |
|---|---|---|---|---|
| 5,632,034 A * | 5/1997 | O'Farrell | ...................... | 717/140 |
| 6,351,843 B1 * | 2/2002 | Berkley et al. | ................. | 717/128 |
| 6,687,760 B1 * | 2/2004 | Bracha | ........................... | 719/310 |
| 7,058,644 B2 * | 6/2006 | Patchet et al. | ......................... | 1/1 |
| 7,401,324 B1 * | 7/2008 | Dmitriev | ...................... | 717/130 |
| 7,647,579 B2 * | 1/2010 | Drissi et al. | .................... | 717/114 |
| 8,473,925 B2 * | 6/2013 | Gagliardi et al. | ............ | 717/130 |
| 8,490,061 B2 * | 7/2013 | Chung et al. | .................. | 717/128 |
| 8,566,800 B2 * | 10/2013 | Gagliardi | ....................... | 717/130 |
| 2004/0068498 A1 * | 4/2004 | Patchet et al. | ..................... | 707/6 |
| 2004/0163077 A1 * | 8/2004 | Dimpsey et al. | .............. | 717/130 |
| 2006/0130001 A1 * | 6/2006 | Beuch et al. | .................. | 717/130 |
| 2008/0244533 A1 * | 10/2008 | Berg et al. | ...................... | 717/128 |
| 2009/0271769 A1 * | 10/2009 | Krauss | ........................... | 717/133 |
| 2011/0072418 A1 * | 3/2011 | Kalamegham et al. | ......... | 717/128 |
| 2011/0138365 A1 * | 6/2011 | Schmelter et al. | ............. | 717/130 |
| 2011/0138368 A1 * | 6/2011 | Krauss | ........................... | 717/133 |
| 2011/0258209 A1 | 10/2011 | Gagliardi et al. | | |
| 2011/0283263 A1 | 11/2011 | Gagliardi et al. | | |
| 2011/0283264 A1 | 11/2011 | Gagliardi | | |
| 2011/0283265 A1 * | 11/2011 | Gagliardi et al. | ............. | 717/130 |
| 2012/0089966 A1 * | 4/2012 | Martin et al. | .................. | 717/133 |
| 2012/0297370 A1 * | 11/2012 | Sale et al. | ...................... | 717/128 |
| 2013/0042223 A1 * | 2/2013 | Hinkle | ........................... | 717/128 |
| 2013/0047169 A1 * | 2/2013 | Gagliardi et al. | ............. | 719/317 |

OTHER PUBLICATIONS

Design Patterns: Elements of Reusable Object-Oriented Software, [http://en.wikipedia.org/w/index.php?oldid=535862004], Feb. 14, 2013, 9 pages.
Buchli, Frank, "Detecting Software Patterns Using Formal Concept Analysis," [http://www.iam.unibe.ch/~scg/], Sep. 2003, 76 pages.
Heuzeroth, Dirk, et al., "Automatic Design Pattern Detection," University of Vaxjo, Sweden, MSI, Software Technology Group, Feb. 2003, 10 pages.
Birkner, Marcel, "Objected-Oriented Design Pattern Detection Using Static and Dynamic Analysis in Java Software," Thesis, University of Applied Sciences Bonn-Rhein-Sieg, Aug. 2007, 201 pages.

* cited by examiner

*Primary Examiner* — Tuan Q. Dam
*Assistant Examiner* — Zheng Wei
(74) *Attorney, Agent, or Firm* — Vierra Magen Marcus LLP

(57) ABSTRACT

A technique for detecting patterns in the execution of an application. The technique identifies a sequence of methods which are invoked and obtains information regarding attributes of the methods. For example, attribute information such as a class hierarchy can be obtained from an instrumentation API. A data structure representing a hierarchy of the attributes can be created and compared to one or more reference data structures which describe patterns of interest. A decision can be made to provide instrumentation for the methods having the matching attributes. The decision can consider how frequently the pattern is detected and overhead costs of the instrumentation.

20 Claims, 9 Drawing Sheets

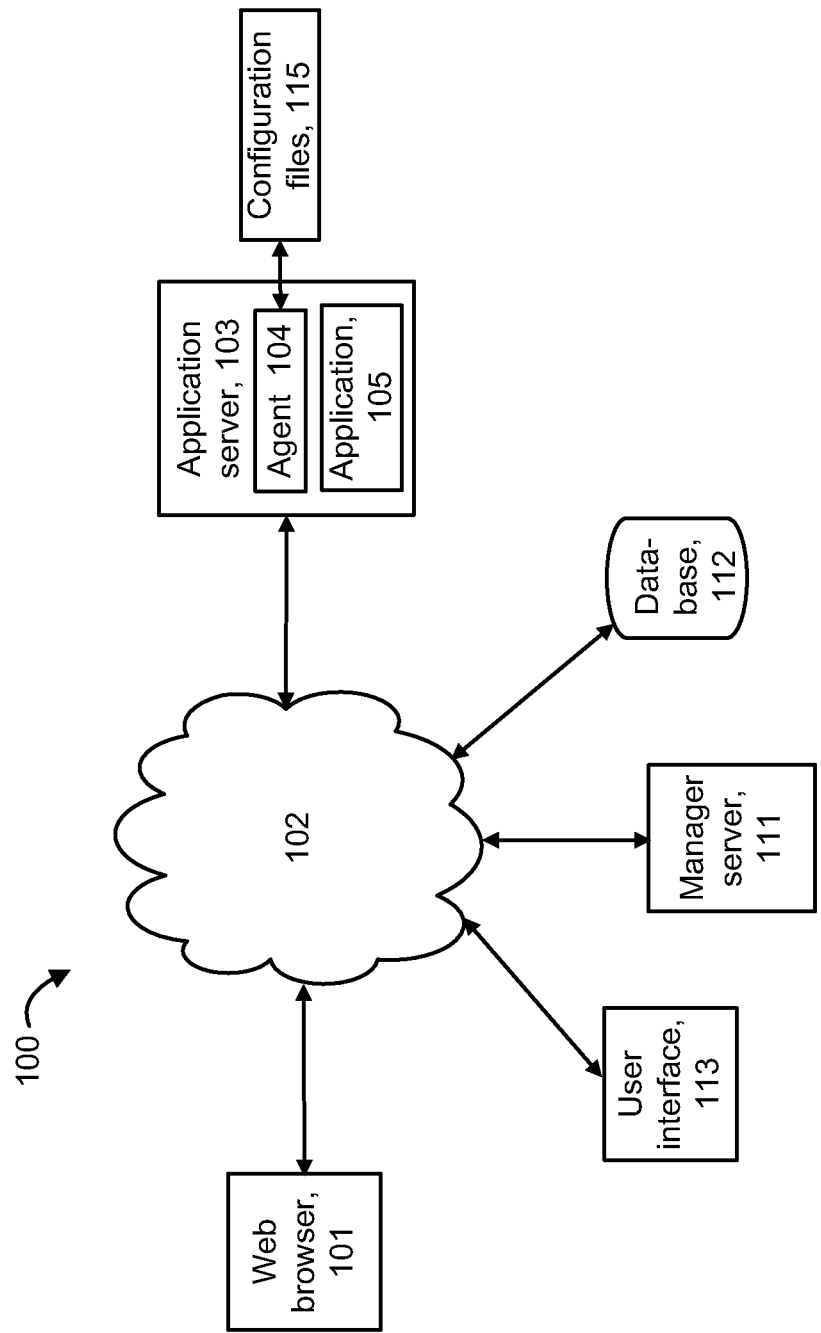

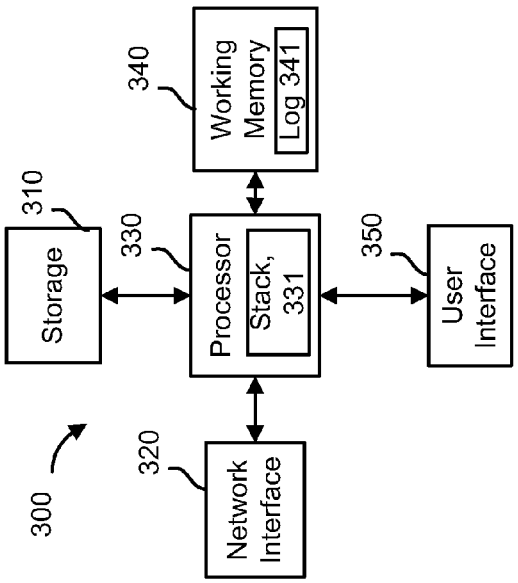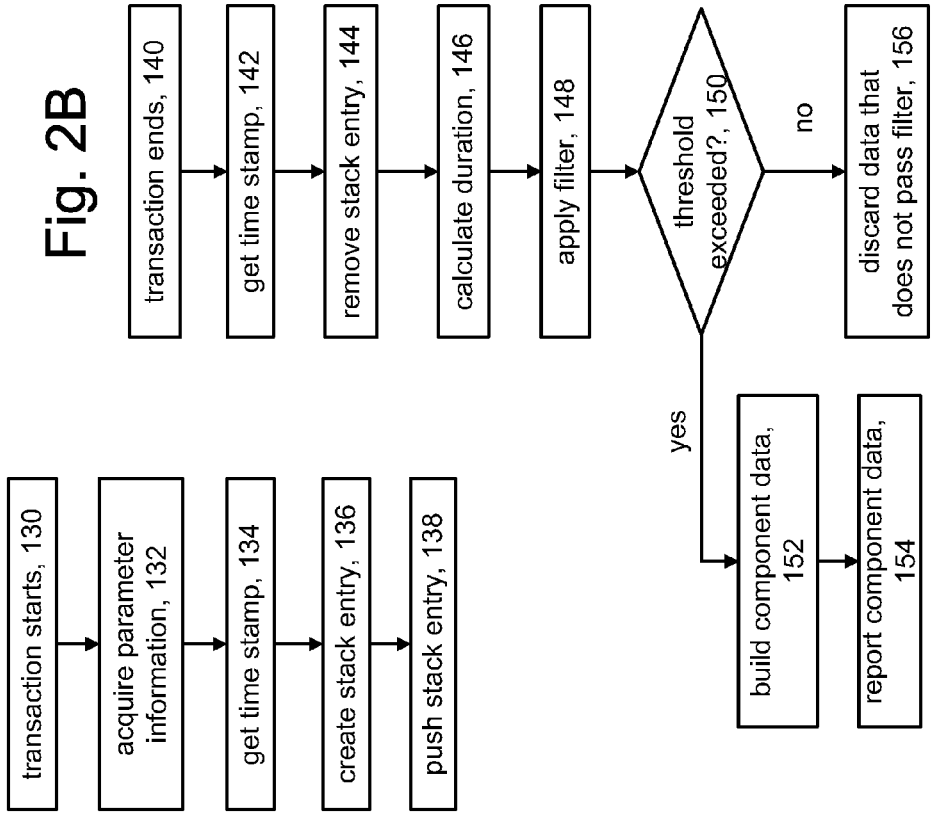

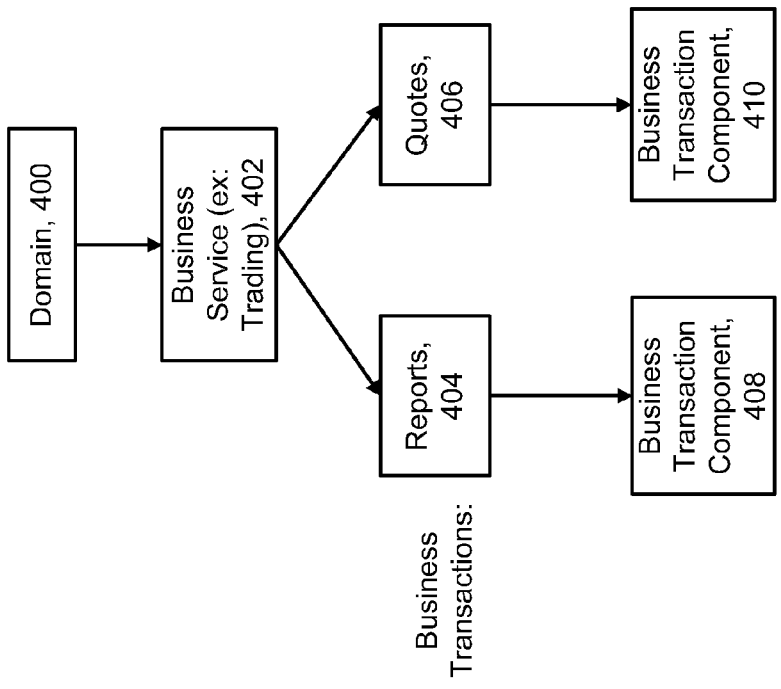
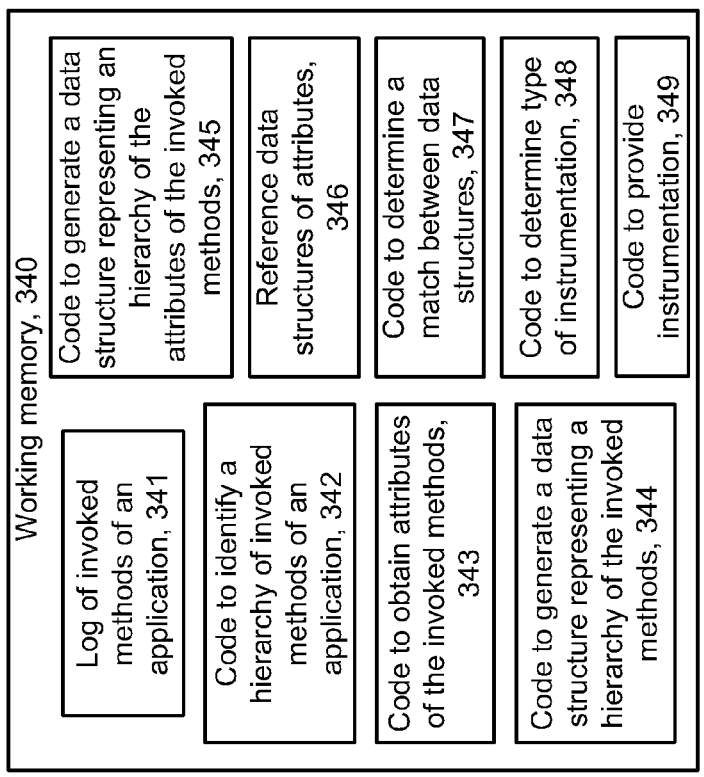

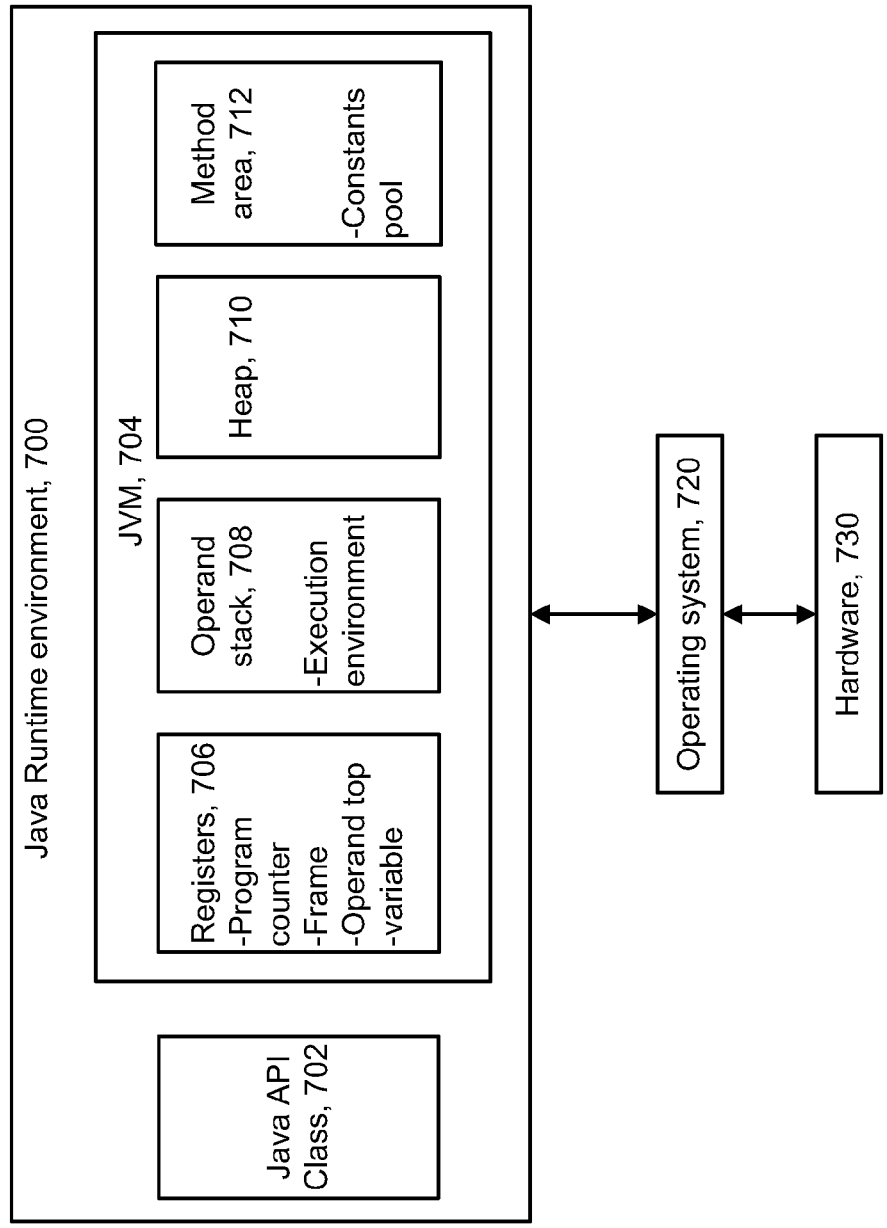

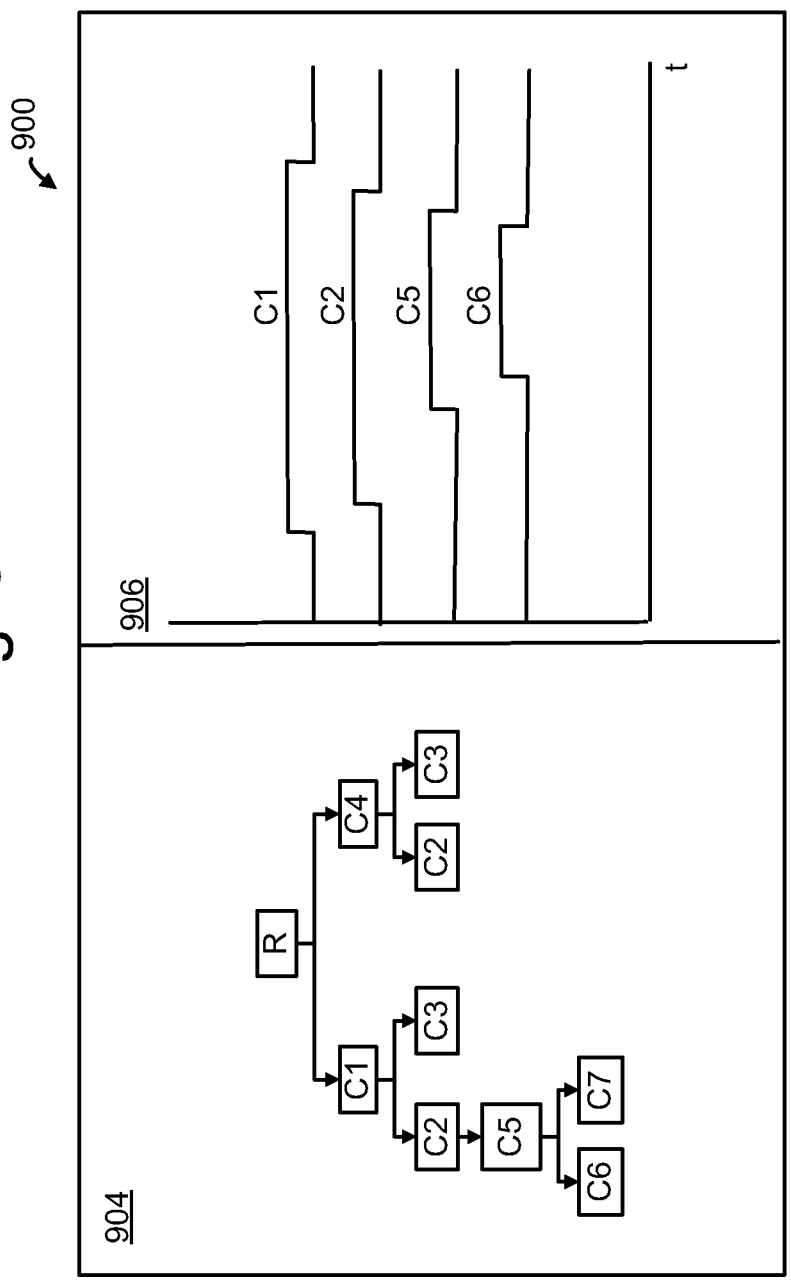

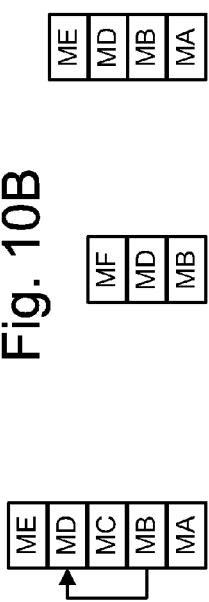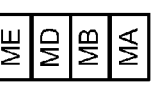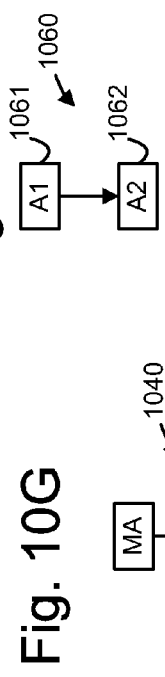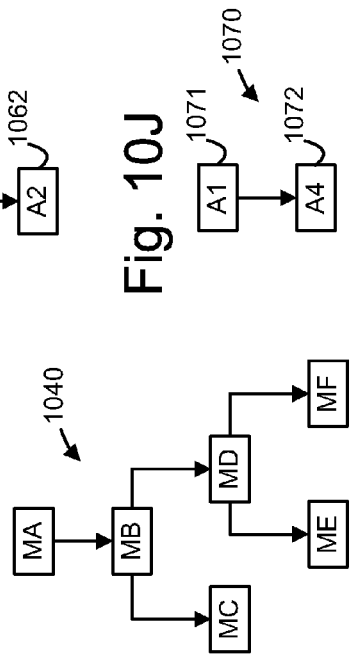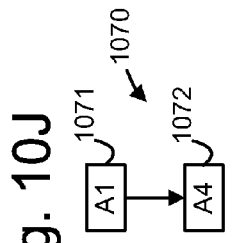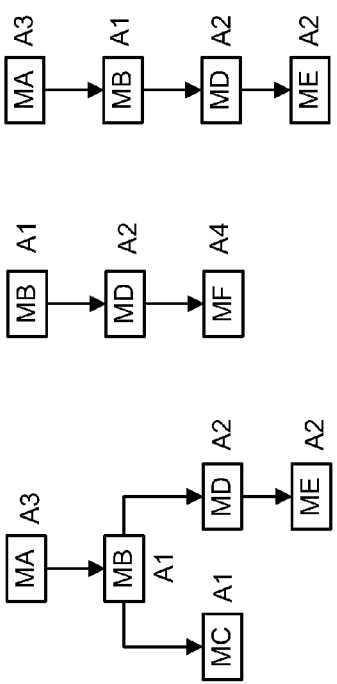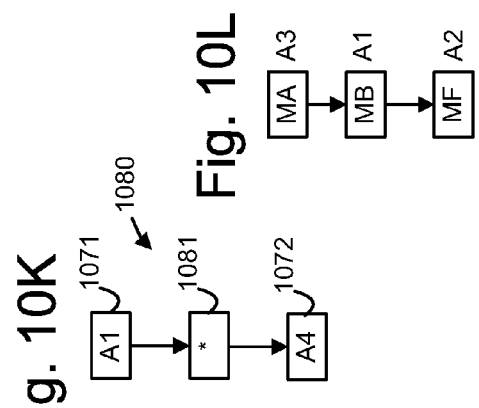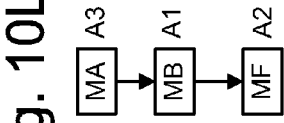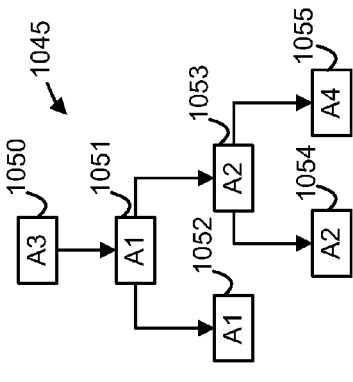

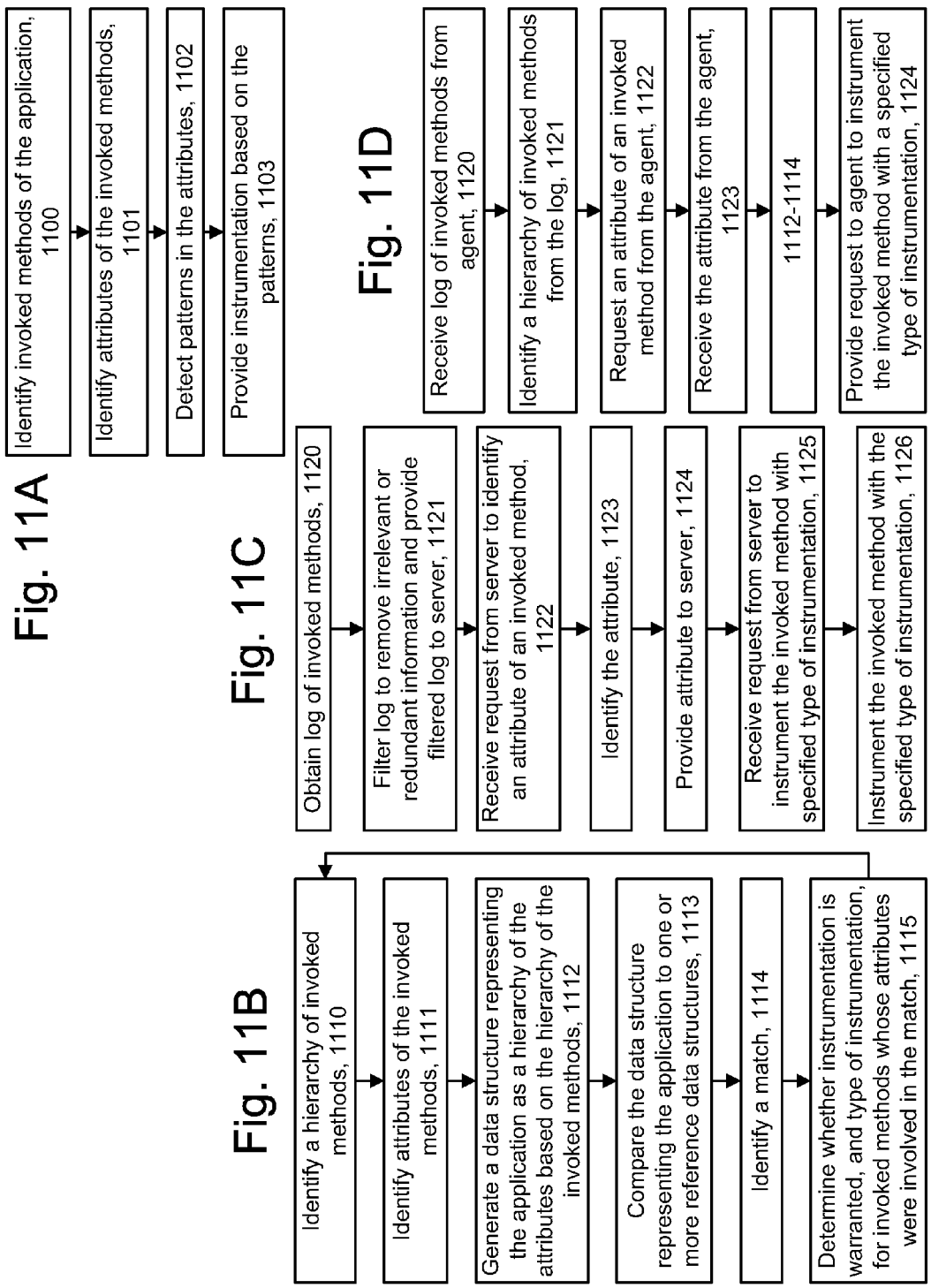

AUTOMATED PATTERN DETECTION IN SOFTWARE FOR OPTIMAL INSTRUMENTATION

BACKGROUND

The growing presence of the Internet as well as other computer networks such as intranets and extranets has brought many new applications in e-commerce, education and other areas. Organizations increasingly rely on such applications to carry out their business or other objectives, and devote considerable resources to ensuring that they perform as expected. To this end, various application management techniques have been developed. One approach involves monitoring the infrastructure of the application by instrumenting the application and using the instrumentation to collect data regarding the individual software components that are invoked in the application. This approach can use agents that essentially live in the system being monitored. For example, using the instrumentation, a thread or process can be traced to identify each component that is invoked, as well as to obtain runtime data such as the execution time of each component. However, it is challenging to provide optimal instrumentation for an application.

BRIEF SUMMARY

Techniques are provided for detecting patterns in how an application executes and using these patterns to provide optimal instrumentation for the application.

A hierarchy of invoked methods of an application and attributes of the invoked methods are identified, and a data structure representing the attributes is generated. The data structure has a hierarchy which is based on the hierarchy of the invoked methods. The data structure is compared to one or more reference data structures to detect a match for patterns of interest. Instrumentation can then be provided for methods whose attributes are involved in the match.

BRIEF DESCRIPTION OF THE DRAWINGS

FIG. 1 depicts an example network including an application server 103 and a manager server 111.

FIG. 2A is a flowchart describing one embodiment of a process for starting the tracing of a transaction.

FIG. 2B is a flowchart describing one embodiment of a process for concluding the tracing of a transaction.

FIG. 3A depicts a computing device of the network of FIG. 1.

FIG. 3B depicts example code of the working memory 340 of FIG. 3A for detecting patterns in how an application executes and using these patterns to provide optimal instrumentation for the application.

FIG. 4 depicts a business hierarchy for use in describing the operation of an application.

FIG. 7 depicts a JAVA runtime environment as one example execution environment of an application of FIG. 1.

FIG. 9 depicts a user interface display which indicates a hierarchical relationship among components, and corresponding performance data.

FIGS. 10A to 10C depict example stack configurations at different sampling times for an application.

FIGS. 10D to 10F depict example hierarchies of invoked methods corresponding to the example stack configurations of FIGS. 10A to 10C, respectively.

FIG. 10G depicts a data structure representing a hierarchy of the invoked methods based on an aggregation of FIGS. 10D to 10F.

FIG. 10H depicts a data structure representing a hierarchy of the attributes of the invoked methods based on the hierarchy of the invoked methods of FIG. 10G.

FIG. 10I depicts an example reference data structure representing a reference hierarchy of attributes.

FIG. 10J depicts another example reference data structure representing another reference hierarchy of attributes.

FIG. 10K depicts another example reference data structure representing another reference hierarchy of attributes.

FIG. 10L depicts another data structure representing a hierarchy of invoked methods.

FIG. 11A depicts a process for detecting patterns in how an application executes and using these patterns to provide optimal instrumentation for the application.

FIG. 11B depicts further details of the process of FIG. 11A.

FIG. 11C depicts further details of the process of FIG. 11B from a perspective of an agent.

FIG. 11D depicts further details of the process of FIG. 11B from a perspective of a manager server.

DETAILED DESCRIPTION

Figure 5:
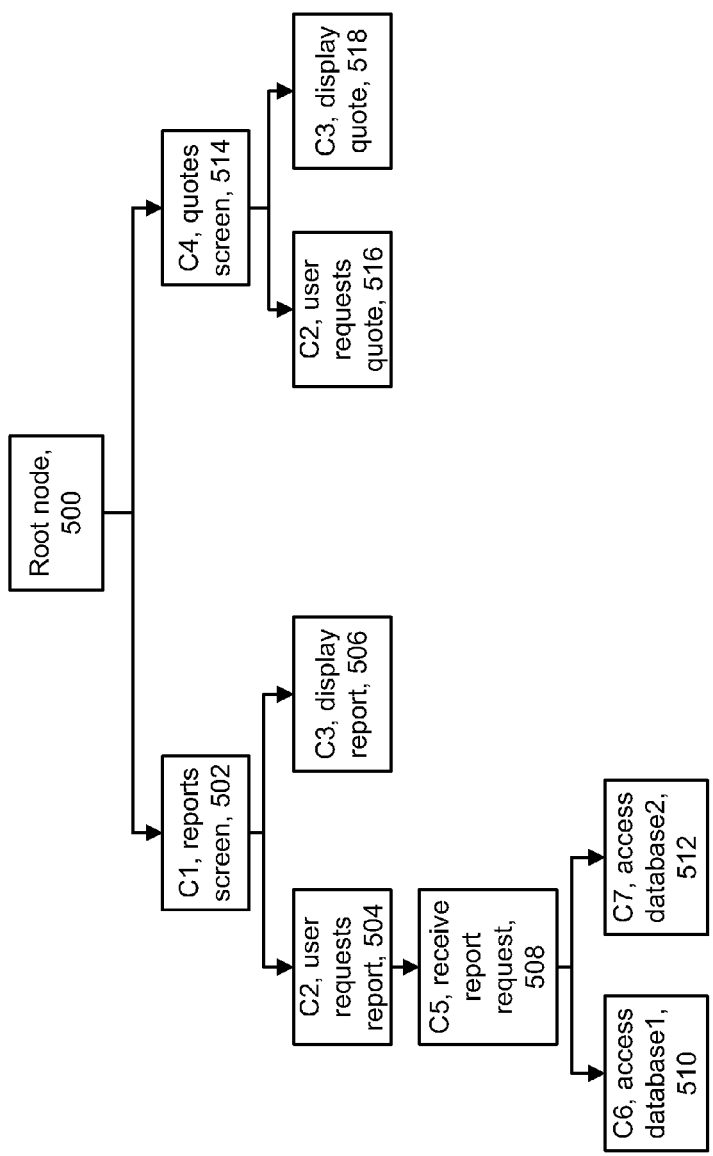
FIG. 5 depicts dependency relationships in an example sequence of components invoked in the Reports and Quotes Business Transactions of FIG. 4.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or by combining software and hardware implementations that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as JAVA, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

As mentioned at the outset, techniques are provided for detecting patterns in how an application executes and using these patterns to provide optimal instrumentation for the application. Instrumentation can provide valuable information regarding the operation of an application. However, identifying an optimal configuration to instrument an application is challenging. If there is too much instrumentation, the overhead costs become too great and a lot of unnecessary data is generated. On the other hand, if there is too little instrumentation, useful information may be missed.

Techniques provided herein detect specific software patterns in an application and use the patterns to identify where to place instrumentation in the application. The type of instrumentation to use can also be identified. Moreover, these patterns are detected in an efficient manner and without knowledge of the application code, a code path analysis or installed instrumentation. The techniques are based on pattern detection. For example, one or more logs can be provided which contain relationship information of the components such as methods of the application, and the pattern detection can be based on an analysis of the logs. In one example implementation, thread sampling is used to obtain and store information about call sequences in the logs.

Several advantages are achieved. First, applications whose design is unknown can be instrumented in a more automated way. Second, stack trace sampling limits overhead costs compared to other approaches such as providing byte code instrumentation of all methods of the application. Third, by performing the pattern recognition at the server side, processing resources (CPU time) are not taken away from the application server so that overhead costs to the application can be minimized. Fourth, the processing of configuring agents for application performance management is simplified. Fifth, the techniques can be used in a production environment as well as in test scenarios.

FIGS. 1-9, discussed below, generally relate to how instrumentation is used in an application. FIGS. 3B and 10A to 11D describe techniques for detecting patterns in how an application executes and using these patterns to provide optimal instrumentation for the application.

FIG. 1 depicts an example network including an application server 103 and a manager server 111. The application server is an example of a managed computing device. One or more of such application servers can communicate with a manager server 111 via a network 102. The network 102 can include, e.g., the Internet, one or more wide area networks, and/or one or more local area networks. The manager server 111 can be local to, or remote from, the application server. The application server can also communicate with a client computing device such as an example web browser 101 via the network 102. The web browser 101 may access the network 102 via an Internet Service Provider, for instance. For example, a corporation running an enterprise application such as a web-based e-commerce application may employ a number of application servers at one location for load balancing. Requests from users, such as from the example web browser 101, are received via the network 102, and can be routed to any of the application servers. Agent software running on the application server, denoted by agent 104, gathers information from an application 105, middleware or other software, running on the respective application server. Such information may be obtained using instrumentation, one example of which is byte code instrumentation. However, the gathered data may be obtained in other ways as well. The agents essentially live in the computing device being monitored and provide a data acquisition point. The agents organize and optimize the data communicated to the manager server 111. In one implementation, different instances of the same application run at the managed computing devices.

The manager server 111 can be provided on a separate computing device such as a workstation which communicates with a user interface 113 (see also FIG. 9), such as a monitor, to display information based on data received from the agents. The manager server can also access a database 112 to store data received from the agents. For instance, some large organizations employ a central network operations center where one or more manager servers obtain data from a number of distributed agents at different geographic locations. To illustrate, a web-based e-commerce enterprise might obtain agent data from servers at different geographic locations that receive customer orders, from servers that process payments, from servers at warehouses for tracking inventory and conveying orders, and so forth. The manager server and user interface display 113 might be provided at a corporate headquarters location. Other applications which are not necessarily web-based or involve retail or other sales, similarly employ agents and managers for managing their systems. For example, a bank may use an application for processing checks and credit accounts. Moreover, in addition to the multi-computing device arrangements mentioned, a single computing device can be monitored as well with one or more agents.

Various approaches are known for instrumenting software to monitor its execution. For example, tracing may be used to track the execution of software. One example of tracing is discussed in U.S. Pat. No. 7,870,431, issued Jan. 11, 2011, titled "Transaction Tracer," and incorporated herein by reference. In one approach discussed therein, object code or bytecode of an application to be monitored is instrumented, e.g., modified, with probes. The probes measure specific pieces of information about the application without changing the application's business or other logic. Once the probes have been installed in the bytecode of an application, it is referred to as a managed application, and a computing device on which the application runs is referred to as a managed computing device. The agent software receives information from the probes and may communicate the information to another process, such as at the manager server 111, or process the information locally, such as to determine whether the information indicates an abnormal condition. The agent thus collects and summarizes information received from the probes. The probes collect information as defined by a directives file. For example, the information from the probes may indicate start and stop times of a transaction or other execution flow, or of individual components within a transaction/execution flow. This information can be compared to pre-established criteria to determine if it within bounds. If the information is not within bounds, the agent can report this fact to the manager so that appropriate troubleshooting can be performed. The agents are typically aware of the software executing on the local managed computing device with which they are associated.

The probes can report a standard set of metrics which include: CORBA method timers, Remote Method Invocation (RMI) method timers, Thread counters, Network bandwidth, JDBC update and query timers, Servlet timers, JAVA Server Pages (JSP) timers, System logs, File system input and output bandwidth meters, Available and used memory and EJB (Enterprise JAVA Bean) timers. A metric is a measurement of a specific application activity. Each of these metrics can be configured by agent metadata.

An agent reports information about transactions, which identifies resources which are accessed by an application. In one approach, when reporting about transactions, the word Called designates a resource. This resource is a resource (or a sub-resource) of a parent component, which is a consumer. For example, assume that Servlet A is the first component invoked in a transaction. Under the consumer Servlet A (see below), there may be a sub-resource Called EJB. Consumers and resources can be reported by the agent in a tree-like manner. Data for a transaction can also be stored according to the tree. For example, if a Servlet (e.g., Servlet A) is a consumer of a network socket (e.g., Socket C) and is also a consumer of an EJB (e.g. EJB B), which in turn is a consumer of a JDBC (e.g., JDBC D), the tree might look something like the following:

```
Servlet A
    Data for Servlet A
    Called EJB B
        Data for EJB B
        Called JDBC D
            Data for JDBC D
    Called Socket C
        Data for Socket C
```

In one embodiment, the above tree is stored by the agent in a stack, called the Blame Stack. A transaction is an execution path inside a system. A system can consist of multiple applications. Inside an application are multiple components which are invoked by a transaction. These components are pushed together with their parameters onto the stack. When the components have completed execution, they are popped off the stack. In one embodiment, each component on the stack has the following information stored: type of transaction, a name used by the system for that transaction, a hash map or dictionary of parameters, a timestamp for when the transaction was pushed onto the stack, and sub-elements. Sub-elements are Blame Stack entries for other components (e.g., methods, process, procedure, function, thread, set of instructions, etc.) that are started from within the transaction of interest. Using the tree as an example above, the Blame Stack entry for Servlet A would have two sub-elements. The monitoring points for a Servlet represent a component on the stack inside a transaction. The first sub-element would be an entry for EJB B and the second sub-element would be an entry for Socket Space C. Even though a sub-element is part of an entry for a particular transaction, the sub-element will also have its own Blame Stack entry. An example of an entry point to a transaction/branch is a URL. As the tree above notes, EJB B is a sub-element of Servlet A and also has its own entry. The top (or initial) entry (e.g., Servlet A) for a transaction, is called the root component. Each of the entries on the stack is an object.

Each agent adds instrumentation to an application and is configured based on one or more configuration files. For example, agent 104 may use configuration files 115 such as an agent profile file, a probe builder directives file and a probe builder list file.

The agent profile files are responsible for enabling/disabling of agent features, location of server, type of communication (e.g., plain socket, SSL, HTTP, HTTP over SSL), location of configuration files and log files, metric sending frequency, and so forth.

A probe builder directives file contains directives for the agent. Directives may contain information about the type and source of metrics to generate, e.g., by specifying at least one method of a class or set of classes to monitor and a type of information to be collected in the application, or information about a formatter for renaming a metric, and so forth. Directives can also specify at least one method of a class or set of classes to instrument.

A PBL (Probe Builder Listing) configuration file is used for grouping a set of PBD files.

In one approach, the application executes in an execution environment such as the JAVA runtime environment, as discussed in connection with FIGS. 7 and 8A. The JAVA runtime environment uses a JAVA Virtual Machine (JVM). Programs intended to run on a JVM are typically compiled into a standardized portable binary format, which usually are in the form of .class files. A program may include many classes in different files. For easier distribution of large programs, multiple class files may be packaged together in a (JAVA Archive) JAR file. The JVM runtime executes CLASS or JAR files, emulating the JVM instruction set by interpreting it, or using a just-in-time compiler (JIT). JIT compiling, as opposed to interpreting, is often used in a JVM to achieve greater speed.

In another possible approach, the application executes in the runtime environment of the .NET framework known as the Common Language Runtime (CLR), as discussed in connection with FIG. 8B.

FIG. 2A is a flowchart describing one embodiment of a process for starting the tracing of a transaction. The steps are performed by the appropriate agent(s). In step 130, a transaction starts. In one embodiment, a transaction starts a class-method pair in the application. The instrumented code in that method calls a method (e.g., "loadTracer") of the Agent. In step 132, the agent acquires the desired parameter information. In one embodiment, a user can configure which parameter information is to be acquired via a configuration file or a UI. The acquired parameters are stored in a hash map or dictionary, which is part of the object pushed onto the Blame Stack. In other embodiments, the identification of parameters is pre-configured. There are many different parameters that can be stored. In one embodiment, the actual list of parameters used is dependent on the application being monitored. The table below provides examples of some parameters that can be acquired.

| Parameters | Appears in | Value |
|---|---|---|
| UserID | Servlet, JSP | The UserID of the end-user invoking the http servlet request. |
| URL | Servlet, JSP | The URL passed through to the servlet or JSP, not including the Query String. |
| URL Query | Servlet, JSP | The portion of the URL that specifies query parameters in the http request (text that follows the '?' delimiter). |
| Dynamic SQL | Dynamic JDBC Statements | The dynamic SQL statement, either in a generalized form or with all the specific parameters from the current invocation. |
| Method | Blamed Method timers (everything but Servlets, JSP's and JDBC Statements) | The name of the traced method. If the traced method directly calls another method within the same component, only the "outermost" first encountered method is captured. |
| Callable SQL | Callable JDBC statements | The callable SQL statement, either in a generalized form or with all the specific parameters from the current invocation. |
| Prepared SQL | Prepared JDBC statements | The prepared SQL statement, either in a generalized form or with all the specific parameters from the current invocation. |
| Object | All non-static methods | toString( ) of the this object of the traced component, truncated to some upper limit of characters. |
| Class Name | All | Fully qualified name of the class of the traced component. |
| Param n | All objects with WithParams custom tracers | toString( ) of the nth parameter passed to the traced method of the component. |

-continued

| Parameters | Appears in | Value |
|---|---|---|
| Primary Key | Entity Beans | toString( ) of the entity bean's property key, truncated to some upper limit of characters. |

Parameters can include query, cookie, post, URL and session type name/value pairs.

In step 134, the system acquires a timestamp indicating the current time. In step 136, a stack entry is created. In step 138, the stack entry is pushed onto the Blame Stack. In one embodiment, the timestamp is added as part of step 138. The process is performed when a transaction is started. A similar process is performed when a sub-component of the transaction starts (e.g., EJB B is a sub-component of Servlet A—see tree described above).

FIG. 2B is a flowchart describing one embodiment of a process for concluding the tracing of a transaction. The process is performed by an agent when a transaction ends. In step 140, the process is triggered by a transaction (e.g., method) ending (e.g., calling of a method in the agent such as "finishTrace"). In step 142, the system acquires the current time. In step 144, the stack entry is removed. In step 146, the execution time of the transaction is calculated by comparing the timestamp from step 142 to the timestamp stored in the stack entry. In step 148, the filter for the trace is applied. For example, the filter may include a threshold period of one second. Thus, step 148, would include determining whether the calculated duration from step 146 is greater than one second. If the threshold is not exceeded (step 150), then the data for the transaction is discarded. In one embodiment, the entire stack entry is discarded. In another embodiment, only the parameters and timestamps are discarded. In other embodiments, various subsets of data can be discarded. In some embodiments, if the threshold period is not exceeded then the data is not transmitted by the agent to other components in the system of FIG. 1. If the duration exceeds the threshold (step 150), then the agent builds component data in step 152. Component data is the data about a transaction that will be reported. In one embodiment, the component data includes the name of the transaction, the type of the transaction, the start time of the transaction, the duration of the transaction, a hash map or dictionary of the parameters, and all of the sub-elements (which can be a recursive list of elements). Other information can also be part of the component data. In step 154, the agent reports the component data by sending the component data via the TCP/IP protocol to the manager server 111.

FIG. 2B represents what happens when a transaction finishes. When a sub-component finishes, however, the steps performed include getting a time stamp, removing the stack entry for the sub-component and adding the completed sub-element to previous stack entry. In one embodiment, the filters and decision logic are applied to the start and end of the transaction, rather than to a specific sub-component.

Note, in one embodiment, if the transaction tracer is off, the system will still use the Blame Stack; however, parameters will not be stored and no component data will be created. In some embodiments, the system defaults to starting with the tracing technology off. The tracing only starts after a user requests it, as described above.

FIG. 3A depicts a computing device of the network of FIG. 1. The computing device 300 is a simplified representation of a system which might be used as one of the web browsers, application server, managers, databases, backend subsystems and/or user interfaces, such as discussed in connection with FIG. 1. The computing device 300 includes a storage device 310 such as a hard disk or portable media, a network interface 320 for communicating with other computing devices, a processor 330 for executing software instructions, a working memory 340 such as RAM for storing the software instructions after they are loaded from the storage device 310, for instance, and a user interface display 350 such as one or more video monitors. A user interface can be provided one or more monitors. The storage device 310 may be considered to be a tangible, non-transitory processor- or computer-readable storage device having processor readable code embodied thereon for programming the processor 330 to perform methods for providing the functionality discussed herein. The user interface display 350 can provide information to a human operator based on the data received from one or more agents. The user interface display 350 can use any known display scheme, whether graphical, tabular or the like (see FIG. 9). In addition to an on-screen display, an output such as a hard copy such from a printer can be provided.

A database may be included in the storage device 310 when the storage device 310 is part of a computing device 300 such as an application server, manager and/or user interfaces. The storage device 310 can represent one or more storage devices which store data received from one or more agents, and which can be accessed to obtain data to provide a user interface as described herein. The storage device 310 can represent a data store. The processor 330 can include a stack 331 which identifies code which is executing in a thread. Examples are provided in FIGS. 10A to 10C. The stack can be periodically sampled to obtain thread stack traces which identify the executing code. The working memory can include a log of invoked methods of an application, 341.

Further details are provided in connection with FIG. 3B.

FIG. 3B depicts example code of the working memory 340 of FIG. 3A for detecting patterns in how an application executes and using these patterns to provide optimal instrumentation for the application. The working memory can include the log 341 of invoked methods of an application, code 342 to identify a hierarchy of the invoked methods of an application from the log, code 343 to obtain attributes of the invoked methods, code 344 to generate a data structure representing a hierarchy of the invoked methods, code 345 to generate a data structure representing a hierarchy of the attributes of the invoked methods, data 346 representing one or more reference data structures of attributes, code 347 which determines a match between the data structures (between a subset of the data structure representing the hierarchy of the attributes of the invoked methods and the one or more reference data structures of attributes), code 348 which determines a type of instrumentation to add based on the match and code 349 to provide the instrumentation, or a request to other code which provides the instrumentation. The data structure can be a tree data structure, or a two or more dimensional data structure such as matrix, for instance, describing a relationship between components. The subset which is matched can comprise a sequence of two or more attributes of the hierarchy of the attributes of the invoked methods. The subset can comprise all, or fewer than all, attributes of the hierarchy of the attributes of the invoked methods.

Further details are provided in connection with FIGS. 10A-11D. The portions of the code can be provided in one or more working memories. In one approach, the code 341 is provided in the application server and the remaining code is provided in the manager server.

FIG. 4 depicts a business hierarchy for use in describing the operation of an application. The different levels of the business hierarchy can be defined based on any desired organizational structure. A business hierarchy may encompass any type of interaction with an application, whether the interaction is in the realm of a for-profit business, such as for e-commerce transactions, educational organization or government organization, for instance. Further, the one or more hierarchies can include nodes at different levels of the one or more hierarchies, where each node has a descriptive name. The business hierarchy can be considered to be an abstract construct which provides a way to organize information about how an application executes in a manner which is more understandable to the human operator.

A top level of the business hierarchy is a domain level 400 named "Domain." A next level of the hierarchy is a Business Service level 402. An example of a Business Service relates to trading a stock using a web site. Thus, "Trading" can be the name of a node at the Business Service level of the hierarchy. A next level of the hierarchy is a Business Transaction level. A Business Service can be made up of a number of Business Transactions. For example, for Trading, the Business Transactions can include Reports 404 (e.g., view a report regarding a stock or an account) and Quotes 406 (e.g., obtain a quote for a stock price). Further, a Business Transaction can be associated with one or more Business Transaction Components. In one approach, a Business Transaction has only one identifying component. A Business Transaction Component can be a type of component of an application which is recognizable and measurable by a server, such as a servlet or EJB. In one approach, one of the components of an application is set as a Business Transaction Component, which is an identifying transaction component for a Business Transaction.

The Business Transaction Component is the identifying transaction component for the transaction that is the identifying transaction for the Business Transaction. A transaction can represent a sequence of software components which are invoked in response to a request from a client, to provide a corresponding response to the client. For example, a Business Transaction Component can be identified by determining when component data reported by an agent match a set of rules. This definition can include, e.g., a specified URL host name, URL parameters, HTTP post parameters, cookie and/or session manager parameters. Additionally, or alternatively, the definition may require a transaction to start with a specified URL host name. The agent or manager, for instance, can compare the component data against the set of rules to determine when a Business Transaction Component is present in a Business Transaction. If a Business Transaction Component is detected, then the associated Business Transaction is of a specified type. For example, if the Business Transaction Component 408 is detected, then the associated Business Transaction is Reports 404. If the Business Transaction Component 410 is detected, then the associated Business Transaction is Quotes 406.

FIG. 5 depicts dependency relationships in an example sequence of components invoked in the Reports and Quotes Business Transactions of FIG. 4. The components are depicted as blocks in a flow path. The same component can appear more than once.

Component-oriented programming models are useful in allowing the programmer to assemble an application or other program from building blocks referred to as components. Each component can perform a specific function which fits in with an overall functionality of the software. Furthermore, a component can call other components, as well as calling itself, in a recursive call, so that a sequence of components is invoked in a program. One example of a component oriented programming model is J2EE (JAVA Platform, Enterprise Edition), which can employ components such as a JAVA Server Page, an EJB, a servlet, and a JAVA Database Connectivity (JDBC) component. JDBC is an Application Programming Interface (API) for the JAVA™ programming language that defines how a client may access a database. It provides methods for querying and updating data in a database. However, other component oriented programming models such as the MICROSOFT CORP. ".NET" Framework may also be used. Moreover, the programming model need not be object oriented.

This example provides details of the Reports and Quotes Business Transactions discussed previously. In one possible implementation, each component of a Business Transaction includes one or more class-method pairs. For example, a servlet is a JAVA class. It is an object that receives a request and generates a corresponding response. A class-method pair can be represented by the notation class.method. For example, Reports could include a component C1 (502) which displays a reports screen on a user interface (UI) to receive a user's input regarding a desired report. An example format of a class-method pair for C1 is ServletA1.DisplayReportScreen. C1 is under a root 500. Thus, whenever an agent detects that C1 has been invoked, it concludes that the current transaction is part of Reports, and associates its component data with Reports.

C1 can call C2 (504) which relates to a requested report. C2 could include a class-method pair such as ServletA2.RequestedReport which processes a user input of a requested report. This processing could include checking the format of the request, for instance, and, if the format is valid, making a call to a component C5 (508), which receives the report request. For instance, this call may be a cross-process, cross-thread transaction or cross-subsystem call. If the format is invalid, the control flow returns to C1, which may call C3 to display an error message, for instance.

An example format of a class-method pair for C5 is ServletA3.ReceiveReportRequest. C5 can call C6 (510) to access a database1 and/or C7 (512) to access a database2, such as based on the type of the report request. For example, C6 and C7 can each include a JDBC driver call which invokes one or more SQL statements. The control flow then returns to C5, then to C2 and then to C1. Subsequently, C1 calls C3 (506) which relates to providing a display, such as a display of the requested report based on data retrieved from the databases. The control flow then returns to C1.

Also, under the root 500, a component C4 (514) can be provided which displays a quotes screen on a user interface (UI) to receive a user's input regarding a desired quote. C1 can call C2 (504) which relates to a requested report. C2 can process the user input by checking the format of the request, for instance, and if the format is valid, obtaining the requested quote, such as from a data source which is local to subsystem1. If the format is invalid, the control flow returns to C4, which may call C3 to display an error message, for instance. The control flow then returns to C4. C4 can call C3 (518), which relates to providing a display, such as a display of the requested quote based on the data retrieved from the data source. C2 (516) can also be called from C4.

Note that a component can continue executing after calling another component, which begins executing, in an asynchronous, multi-thread or multi-process mode. Or, a component can temporarily pause until the called component has finished executing, in a synchronous, single-thread or single-process mode. A component which is pausing can be considered to be in a wait interval, while a component which is executing can be considered to be in an active, executing mode. Also, a component may be invoked more than once during a transaction.

Figure 6:
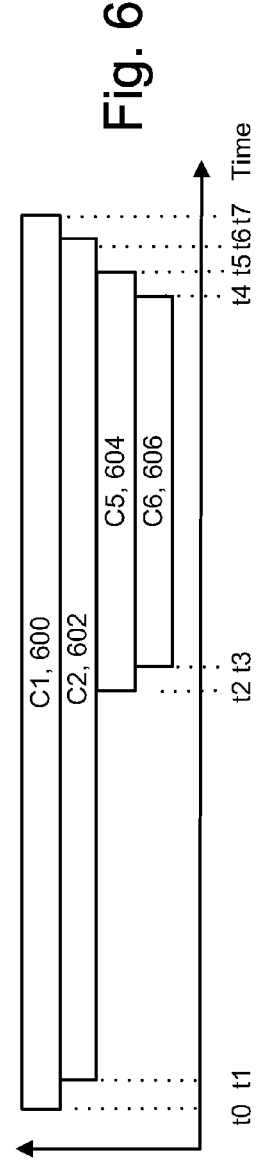
FIG. 6 depicts a transaction trace for a sequence of invoked components in the transactions of FIG. 5.

FIG. 6 depicts a transaction trace for a sequence of invoked components in the transactions of FIG. 5. The horizontal direction represents time, while the vertical direction indicates call stack depth or position. A transaction trace, also referred to as a call stack, identifies instrumented components which have been called or invoked during the execution of one or more programs, processes or threads. Trace data of instrumented components can be used along with dependency data to understand and debug an application. A transaction trace can be a trace of all or a portion of a transaction and can extend over one or more computing devices having respective agents. In particular, a separate transaction trace can be provided for each agent, such that different threads are separated out into different transaction traces. The transaction trace can be provided by a graphical representation on a user interface display, such as in FIG. 9.

In contrast, a thread stack trace such as depicted in FIGS. 10A to 10C, identifies invoked methods at a point in time without using instrumentation.

The transaction trace of FIG. 6 involves components C1, C2, C5 and C6, represented by graph portions 600, 602, 604 and 606, respectively. C1 starts executing at t0 and ends or stops at t7. C2, which is called by C1, starts executing at t1 and ends at t6. C5, which is called by C2, starts executing at t2 and ends at t5. C6, which is called by C5, starts executing at t2 and ends at t4. The time increments are not necessarily equidistant.

FIG. 7 depicts a JAVA runtime environment as one example execution environment of an application of FIG. 1. The JAVA runtime environment 700 is built on an operating system, 720, which is built on hardware 730. The JAVA runtime environment includes a number of virtual parts, including the JAVA API Class 702 and a JVM 704. The JVM includes registers 706, an operand stack 708, a heap 710 and a method area 712. The JVM processes a stream of byte codes as a sequence of instructions. A JVM instruction consists of an opcode specifying the operation to be performed, followed by zero or more operands embodying values to be operated upon. The operand stack 708, heap 710 and method area 712 are within addressable memory. The size of an address is 32 bits, each memory location contains one byte, and each register stores one 32-bit address. The method area contains byte codes and is aligned on byte boundaries, while the operand stack and the heap are aligned on word (32-bit) boundaries.

The registers include a program counter (pc), which keeps track of where in the memory it should be executing instructions. The program counter identifies the next byte code to be executed. The frame register contains a pointer to the execution environment of the current method in the operand stack. The operand top (optop) register contains a pointer to the top of the operand stack, and is used to evaluate arithmetic expressions. The variable (vars) register contains a pointer to local variables.

The operand stack supplies parameters to methods and operations and receives results back from them. All byte code instructions take operands from the stack, operate on them, and return results to the stack. The operand stack includes a stack frame of an executing method. The stack frame holds the state, e.g., local variables, and intermediate results of calculations, for a particular invocation of a method. Specifically, each JVM thread has a private JVM stack, created at the same time as the thread. A JVM stack stores frames, holds local variables and partial results, and plays a part in method invocation and return. A frame is thus used to store data and partial results, as well as to perform dynamic linking, return values for methods, and dispatch exceptions. A new frame is created each time a method is invoked. A frame is destroyed when its method invocation completes, whether that completion is normal or abrupt (it throws an uncaught exception). Frames are allocated from the JVM stack of the thread creating the frame. Each frame has its own array of local variables, its own operand stack, and a reference to the runtime constant pool of the class of the current method.

The heap or memory allocation pool is garbage collected. The heap is the runtime data area from which memory for all class instances and arrays is allocated. The heap is created on virtual machine start-up, and heap storage for objects is reclaimed by an automatic storage management system known as a garbage collector. Specifically, each program running in the JAVA runtime environment has a garbage-collected heap assigned to it. Moreover, each class in the heap has a constant pool associated with it. Because constants do not change, they are usually created at compile time. Items in the constant pool encode all the names used by any method in a particular class. The class contains a count of how many constants exist, and an offset that specifies where a particular listing of constants begins within the class description.

The method area stores byte code instructions that are associated with methods in the compiled code, and a symbol table which the execution environment needs for dynamic linking Any debugging or additional information that might need to be associated with a method is stored in this area as well. The program counter always points to, e.g., contains the address of, some byte in the method area. The program counter is used to keep track of the thread of execution. After a byte code instruction has been executed, the program counter will contain the address of the next instruction to execute.

The method area is shared among all JVM threads, and stores per-class structures such as the runtime constant pool, field and method data, and the code for methods and constructors, including the special methods used in class and instance initialization and interface type initialization. The method area is created on virtual machine start-up. A runtime constant pool is a per-class or per-interface runtime representation of the constant_pool table in a class file. It contains several kinds of constants, ranging from numeric literals known at compile time, to method and field references that must be resolved at run time. Each runtime constant pool is allocated from the JVM's method area. The runtime constant pool for a class or interface is constructed when the class or interface is created by the JVM.

Figure 8A:
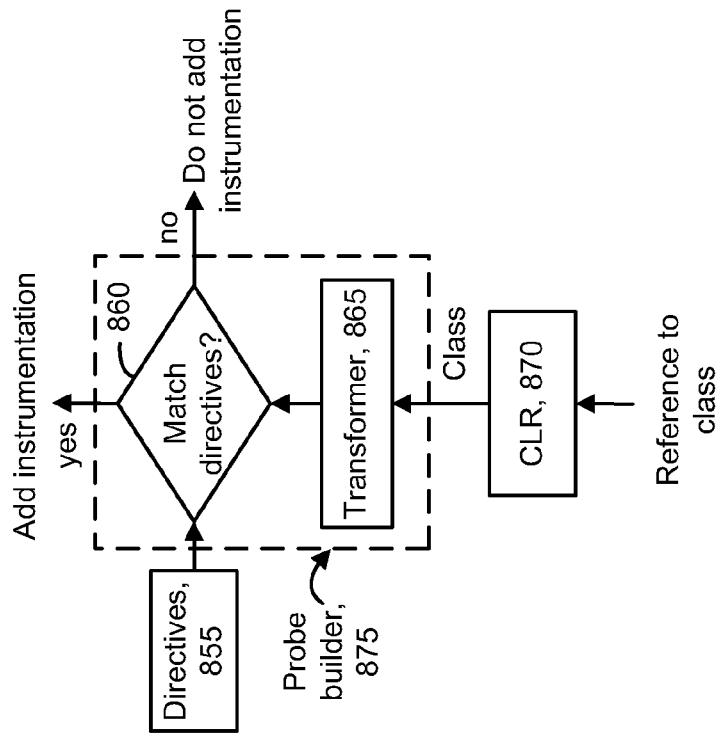
FIG. 8A depicts a JAVA-based example process flow for static instrumentation.

FIG. 8A depicts a JAVA-based example process flow for static instrumentation. The process may be implemented by an agent, such as depicted in FIG. 1, in one possible approach. One approach to instrumentation involves providing static rules which determine which components, such as methods, are to be instrumented. The rules are accessed, e.g., from one or more configuration files, at the time the components are loaded into the application. In such an approach, a class loader 820 is used to provide raw data bytes of an application byte code to a transformer 815, which transforms the raw bytes into a class, for instance. For example, in JAVA, this may involve using the method defineClass of the ClassLoader object, which is responsible for loading classes. The class ClassLoader is an abstract class. Given the name of a class, a class loader should attempt to locate or generate data that constitutes a definition for the class. A typical strategy is to transform the name into a file name and then read a "class file" of that name from a file system. The method defineClass converts an array of bytes into an instance of class Class. Instances of the class Class represent classes and interfaces in a running JAVA application. The transformer 815 is thus software which can transform byte code to add instrumentation, such as by transforming classes. In one approach, the minimum unit of processing of the transformer 815 is a class file and its byte array.

If the application byte code matches rules (directives) 805 at a decision block 810, the transformer 815 adds probes in the form of tracer byte code. If the application byte code does not matches the rules 805 at the decision block 810, the transformer 815 does not add instrumentation to the byte code. The transformer 815 and the decision block 810 may be considered to be part of a probe builder 825.

In this implementation, the rules 805 are a set of typically static rules that identify portions of the managed application which are to be instrumented. The rules are usually implemented when a class is defined in a virtual machine for the first time. A class can be loaded multiple times while being defined only once. For example, there can be multiple class loaders loading the same class. Further, components such as classes may be instrumented based on whether they are named a certain way, whether they implement a certain interface, whether they extend a certain subclass or super class, and so forth. Such components are selected to be instrumented because it is believed they might provide performance data which is useful or otherwise interesting.

For instance, a rule may indicate that all servlets should be instrumented since it is believed that at least some of the servlets may provide interesting data. In this case, the rules 805 may indicate that all components that are subclasses of the JAVA class HttpServlet should be instrumented. HttpServlet is an abstract class from which all servlets depend. However, not all components can be instrumented, and there is a tension in that over-inclusive instrumentation results in excessive overhead costs and possibly impairing the operation of the application, while under-inclusive instrumentation results in the omission of important performance data.

Figure 8B:
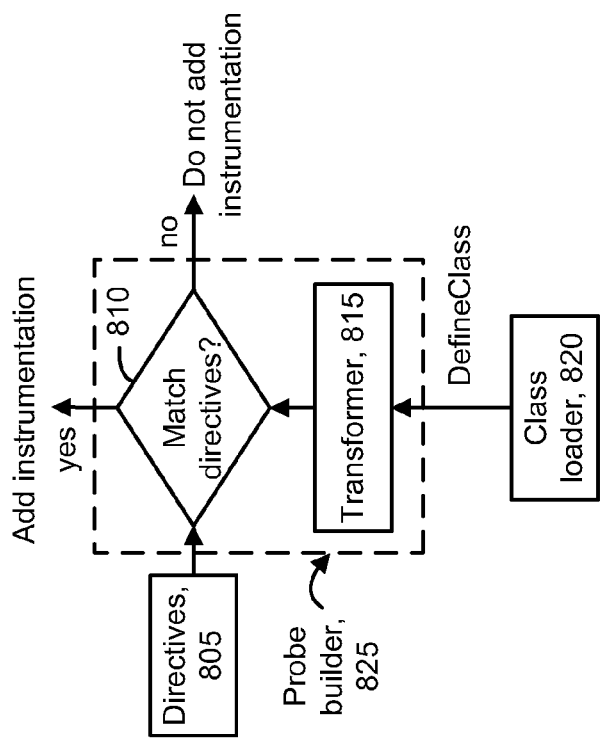
FIG. 8B depicts a .NET-based example process flow for static instrumentation.

FIG. 8B depicts a .NET-based example process flow for static instrumentation. In another possible approach, the components of the managed application are provided according to the MICROSOFT CORP. ".NET" Framework. Unlike JAVA, the .NET framework does not use class loaders. Instead, .NET includes a virtual machine that manages the execution of programs written specifically for the framework. The runtime environment of the .NET framework is known as the Common Language Runtime (CLR). The CLR provides the appearance of an application virtual machine so that programmers need not consider the capabilities of the specific CPU that will execute the program. The CLR also provides other services such as security, memory management, and exception handling. A class library of pre-coded solutions and the CLR together compose the .NET Framework.

Moreover, the CLR is an implementation of a Common Language Infrastructure (CLI) which provides a language-neutral platform for application development and execution, including functions for exception handling, garbage collection, security, and interoperability. The CLI includes the core class libraries, Common Type System, and the Common Intermediate Language (CIL). As with JAVA byte code, CIL is another example of intermediate byte code. JAVA and .NET provide example implementations only, as other implementations are possible.

Here, the process may be implemented by an agent, in one possible approach. In one possible scenario, some process in the .NET framework references a class by name, and the CLR 870 finds the class, shows it to a transformer 865 (if any) and uses the resultant CIL. In particular, if the class matches rules 855 at a decision block 860, instrumentation is added. If the class does not match the rules 855 at the decision block 860, instrumentation is not added. The transformer 865 and the decision block 860 may be considered to be part of a probe builder 875.

FIG. 9 depicts a user interface display which indicates a hierarchical relationship among components, and corresponding performance data. The user interface 900 includes a display region 904 which identifies the names of one or more instrumented components, and a dependency relationship, such as in FIG. 5. The user can select one or more components in the display region 904 to display performance data, e.g., a trace, for that component based on its instrumentation, in a display region 906. The traces are based on FIG. 6 in this example. The display region 904 can be automatically populated with each of the components in the application using a hierarchical data structure which shows which components are under, or called by, another component. The display region 906 depicts performance data such as transaction traces of the instrumented components based on the instrumentation, for selected ones of the components in the region 904. The region 906 can be populated with performance data provided from an agent to a manager.

FIGS. 10A to 10C depict example stack configurations at different sampling times for an application. In one approach, a stack can be sampled at a point in time to obtain a thread stack trace which identifies the currently-executing code. For example, invoked methods can be identified. Moreover, an order or sequence in which the methods are invoked and a calling relationship among the methods can be identified based on their relative positions in the stack. Specifically, earlier invoked methods are near the bottom of the stack and later invoked methods are near the top of the stack.

In the example of FIG. 10A, a method MA is invoked, followed by a method MB which is invoked by MA. This sequence can be represented by a notation MA→MB. A method MC is invoked by MB, then a method MD is invoked by MB. The arrow is a pointer indicating that MD is called by MB. Other information such as parameters which are passed between the methods can also be included in the stack. A method ME is invoked by MD.

In the example of FIG. 10B, MB is invoked, followed by MD which is invoked by MB. A method MF is then invoked by MD.

In the example of FIG. 10C, MA is invoked, followed by MB which is invoked by MA. MD is then invoked by MB, and ME is invoked by MD. These are simplifications of stack data. A more specific example if provided further below.

FIGS. 10D to 10F depict example hierarchies of invoked methods corresponding to the example stack configurations of FIGS. 10A to 10C, respectively. FIG. 10D identifies a hierarchy corresponding to FIG. 10A in which MA calls MB, MB calls MC and MD, and MD calls ME. Further, each method has one or more associate attributes, as discussed further below. For example, MB and MC have attribute A1, MD and ME have attribute A2 and MA has attribute A3. A method can have one or more attributes of interest and one or more methods can share a common attribute of interest. Moreover, a method having one attribute can call another method having the same or a different attribute.

FIG. 10E identifies a hierarchy corresponding to FIG. 10B in which MB calls MD and MD calls MF. Further, MB has attribute A1, MD has attribute A2 and MF has attribute A4.

FIG. 10F identifies a hierarchy corresponding to FIG. 10C in which MA calls MB, MB calls MD and MD calls ME. Further, MB has attribute A1, MD and ME have attribute A2 and MA has attribute A3. Thus, FIGS. 10D to 10F also provide data structures representing the application in the form of a hierarchy of attributes of the invoked methods at each sampling time of the stack.

FIG. 10G depicts a data structure 1040 representing a hierarchy of the invoked methods based on an aggregation of the data structures of FIGS. 10D to 10F and 10L, discussed further below. By aggregating the hierarchies of invoked methods over multiple sampling times, an aggregated hierarchy can be obtained which provides a good representation of the methods which are invoked in the application. Essentially, the data structures of FIGS. 10D to 10F and 10L can be combined according to the common nodes which represent a common invoked method. The resulting data structure indicates that MA calls MB, MB calls MC and MD, and MD calls ME and MF.

FIG. 10H depicts a data structure 1045 representing a detected hierarchy of the attributes of the invoked methods based on the hierarchy of the invoked methods of FIG. 10G. By aggregating the attributes of the invoked methods over multiple sampling times, an aggregated hierarchy can be obtained which provides a good representation of the attributes which are used in the application and the order in which they are used. The resulting data structure indicates that one or more methods having the attribute A3 (node 1050) invoke one or more methods having the attribute A1 (node 1051). This can be represented by a notation A3→A1. Further, the one or more methods having the attribute A1 of node 1051 invoke one or more methods having the same attribute A1 (node 1052) and one or more methods having the attribute A2 (node 1053). The one or more methods having the attribute A2 of node 1053 invoke one or more methods having the same attribute A2 (node 1054) and one or more methods having the attribute A4 (node 1055).

FIG. 10I depicts an example reference data structure 1060 representing a reference hierarchy of attributes. A reference data structure indicates a sequence of two or more attributes which are of interest when they occur in an application. The order of the attributes is relevant as well as the attributes themselves. In this example, the data structure indicates that a node 1061 (attribute A1) calls a node 1062 (attribute A2). The designer can create one or more reference data structures based on patterns of attributes which are of interest.

FIG. 10J depicts another example reference data structure 1070 representing another reference hierarchy of attributes. In this example, the data structure indicates that a node 1071 (attribute A1) calls a node 1072 (attribute A4).

FIG. 10K depicts another example reference data structure 1080 representing another reference hierarchy of attributes. In this example, the data structure of FIG. 10J is modified to add a wildcard (*) node 1081 which indicates that any attribute (or no attribute) can be used between A1 and A4. Thus, in one approach, the reference pattern of FIG. 10J requires, e.g., that a method with attribute A1 directly calls a method with attribute A4. That is, the method with attribute A1 does not call another method which in turn calls the method with attribute A4, in an indirect call. In contrast, the reference pattern of FIG. 10K allows, e.g., a method with attribute A1 to directly or indirectly call the method with attribute A4. The node 1081 can indicate that there can be exactly one intermediate attribute between A1 and A4, zero or one or more intermediate attributes, or one or more intermediate attributes.

FIG. 10L depicts another data structure representing a hierarchy of invoked methods. The data structure includes MA (with attribute A3) calling MB (with attribute A1), and MB calling a method MF (with attribute A2). This data structure is already represented by the data structure 1045 so no change to that data structure is made. However, this is an example of a repeated sequence of attributes (A3→A1→A2) based on another hierarchy of invoked methods since FIGS. 10H and 10L both have the same sequence of attributes (A3→A1→A2). Moreover, different methods have the same attribute (MD in FIG. 10H and MF in FIG. 10L have attribute A2).

FIG. 11A depicts a process for detecting patterns in how an application executes and using these patterns to provide optimal instrumentation for the application. At a high level, the process includes identifying invoked methods of an application (step 1100), identifying attributes of the invoked methods (step 1101), detecting patterns in the attributes (step 1102) and providing instrumentation based on the patterns (step 1103).

FIG. 11B depicts further details of the process of FIG. 11A. As an overview, a JAVA agent, in the case of the JAVA framework, or a CLR profiler, in the case of the .NET framework, can be attached to the non-instrumented application and used to sample the stack as the application runs.

Step 1110 involves identifying a hierarchy of invoked methods such as depicted in FIG. 10D to 10F. Step 1111 includes identifying attributes of the invoked methods. In some cases, an attribute can be determined from the sampling of the stack. In other case, an attribute can be determined by sending a request to the agent with the method name. For example, given the class of a method, the agent can look up an attribute such as one or more superclasses of the method (classes from which the class of the method inherits). Step 1112 includes generating a data structure representing the application as a hierarchy of the attributes based on the hierarchy of the invoked methods. See the example data structure 1045 of FIG. 10H. Step 1113 includes comparing the data structure representing the application to one or more reference data structures, e.g., in a library. Step 1114 identifies one or more matches.

See the example reference data structures of FIG. 10I to 10K. In this case, there is a match between the data structure 1045 and the reference data structures 1060 and 1080 but not 1070. For example, nodes 1051 and 1053 of data structure 1045 match nodes 1061 and 1062 of data structure 1060. Also, nodes 1051 and 1055 of data structure 1045 match nodes 1071 and 1072 of data structure 1080. Nodes 1051 and 1055 of data structure 1045 do not match nodes 1071 and 1072 of data structure 1070 due to the intermediate attribute A2 in node 1053. Thus, a match can involve a match between a subset (fewer than all) of the nodes of the data structure 1045 and all nodes of a reference data structure.

Step 1115 determines whether instrumentation is warranted, and a type of instrumentation, for invoked methods whose attributes were involved in the match. For example, in the match between nodes 1051 and 1053 of data structure 1045 and nodes 1061 and 1062 of data structure 1060, the attributes A1 and A2 in the sequence A1→A2 are involved in the match. The invoked methods whose attributes were involved in the match are therefore MB and MD from FIG. 10G. Thus, a determination is made as to whether instrumentation is warranted for these methods. In one approach, determining whether instrumentation is warranted is based on whether the match occurs with at least a minimum frequency. For example, does the sequence A1→A2 occur in 10% or more of the samples? In another approach, the attribute is a class or superclass of the method and determining whether instrumentation is warranted is based on usage of the class and an estimate of an overhead cost of instrumentation based on the usage. For example, estimating the usage of the class can involve determining a number of occurrences of the class, of the number of occurrences of a superclass. Or, the value can be based on the frequency with which the class appears. A CPU cost can be associated with these values, and the cost compared to a threshold. In one approach, if the cost exceeds a threshold, the method is not instrumented. If the cost does not exceed the threshold, the method is instrumented.

In this example, the detected hierarchy of the application of FIG. 10G has a sequence of two attributes (A1 and A2) which match the reference data structure of FIG. 10I. Further, two invoked methods (MB and MD) are associated with the two attributes of the detected hierarchy. The match involves one attribute (A1) of the detected hierarchy associated with one of the invoked methods (MB) and another attribute (A2) of the detected hierarchy associated with another of the invoked methods (MD). Generally, the pattern matching can involve multiple factors and can take into account the relationship among each of the monitored components/methods, their parameters and the execution flow.

Step 1115 also determined a type of instrumentation to add when instrumentation is warranted. The type of instrumentation or a method can be based on the associated attribute. For example, for a method associated with an HTTP request, it may be desirable for the instrumentation to capture parameters that are passed with the request. In other cases, parameters may not be passed or may not be of interest so that the instrumentation does not capture such parameters. Instrumentation can be added on every possible component/method in a system. Example components include a Struts Action (an instance of a subclass of an Action class, which implements a portion of a Web application such as by validating a user name and password or performing a computation), a EJB method and a SQL (Structured Query Language) statement execution. Different types of instrumentation could obtain timing information, error detection information (exceptions), a count of invocations, sampling of transactional data and reading of object states.

FIG. 11C depicts further details of the process of FIG. 11B from a perspective of an agent. In this approach, much of the processing is performed by the manager server so that the application server is not burdened. However, the processing could optionally be performed at the application server as well.

Step 1120 involves obtaining a log of invoked methods. This log can contain information about the components of an application, their sequence of execution and a map of data per component. In one possible implementation, the log is obtained by sampling the stack of the application to obtain thread stack traces. Step 1121 involves filtering the log to remove irrelevant or redundant information and providing the filtered log to the server. Step 1122 involves receiving a request from the server to identify an attribute of a method, or to identify one or more attributes of one or more methods. Step 1123 identifies the attribute. Step 1124 involves providing the attribute to the server. Step 1125 involves receiving a request from the server to instrument the invoked method with a specified type of instrumentation. Step 1126 involves instrumenting the invoked method with the specified type of instrumentation. See, e.g., FIGS. 8A and 8B.

FIG. 11D depicts further details of the process of FIG. 11B from a perspective of a manager server. This process is a counterpart to FIG. 11C. Step 1120 involves receiving a log of invoked methods from an agent. Note that a managing server could also analyze logs from agents of multiple application instances. Step 1121 involves identifying a hierarchy of invoked methods from the log. Step 1122 involves requesting an attribute of an invoked method from the agent. In practice, requests involving attributes of multiple methods can be transmitted periodically to the agent. Step 1123 involves receiving the attribute from the agent. Subsequently, steps 1112-1114 of FIG. 11B are performed. Step 1124 involves providing a request to an agent to instrument the invoked method with a specified type of instrumentation.

In further detail of an example implementation, the sampling of the stack can occur while the application is being exercised. In one approach, the application is exercised in its normal production environment. In another approach, a tool such as a JMeter script is used. JMeter is an APACHE(R) product that can be used as a load testing tool for analyzing and measuring the performance of a variety of services including web applications. Samples of the thread stacks can be retrieved using the JMX console, for instance, on a sample interval e.g., every 1 msec. The JMX management beans allow retrieval of the thread stack programmatically. JMX refers to JAVA Management Extensions (JMX) Technology. The JMX Console enables one to monitor and manage services on a server.

These samples can be used, e.g., to detect the way the classes of the applications call each other vertically through the stack. The sampling also produces a limited amount of horizontal information through time as the application is running.

The process of gathering these thread stacks is very effective and can be implemented efficiently by the JVM, for instance. The agent can filter and discard the thread stacks that are deemed irrelevant or duplicate, and send the relevant stacks to the manager server where the stacks are layered or superimposed and analyzed for pattern detection. Regarding the filtering, typically, many of the stack traces will be repetitions of the same pattern and usually end in the thread waiting on the object monitor. These stacks may be less relevant for instrumentation and can be discarded to improve performance. An example filtering algorithm would compare the stacks with a known base of non-interesting stack traces and discard the stack traces that are not interesting. Regarding the layering, this can involve grouping together the parts of the stacks that are common to the threads such as discussed in connection with the grouping of the data structures of FIGS. 10D to 10F and 10L to provide the data structure of FIG. 10H. This allows common patterns to be detected. As more and more of these common stack calls are detected, the common calls of the application are detected. For example, even if we were not to know that the application is using J2EE and servlets, we would quickly detect that the calls of the application all get channeled through the HttpServlet.service method. By superimposing the stack traces, over a given amount of time, the relevant execution patterns of the application are statistically bound to appear.

The server side may gather information on the hierarchy of the classes of the application that are detected in the stack traces. In some cases, the server may ask the agent for this information. The agent can access the class hierarchy using the Instrumentation API that it has available. For example, the java.lang.instrument package provides a JAVA programming language API for tools to instrument JAVA programming language applications. This API can be used to obtain the class hierarchy. As an example, consider a hierarchy with class1 at the top, class2 at the second level and class 3 at the third level. A method may be identified as being in class3 from the thread stack trace. The API can then be used to determine that class2 and class1 are superclasses (classes at a higher level in the class hierarchy) of class3. The server can communicate a request to the agent to provide the class hierarchy of class3.

Ultimately, the patterns detected in the class calls are matched against a set of pre-defined patterns available in a library that is configured and extended when appropriate. At this point, it becomes a business decision regarding what classes to instrument. Through this process we also may gather an estimate of the usage of the classes so that an estimate of the instrumentation overhead can be determined. The usage may be indicated by how frequently the class appears in the samples. We can detect that the application uses one or more specific patterns (for example, a pattern in which some classes are called all the time or a pattern in which some other classes are often involved in error management) because we can create a representation of the code calls of the application.

In one approach, the stack is sampled by obtaining a thread dump, e.g., a list of all the threads of the application that are currently active. In the case of JAVA, this can be the threads that are currently active in the JVM. The specific commands used for sampling are based on the operating system on which the application runs. For Unix, Mac OSX and Linux, in the case of JAVA, a thread dump is obtained by sending a QUIT signal to the JAVA process to tell it to output a thread dump to standard output (e.g., a text file or screen display). The following command can be used: kill -QUIT <pid>, where the pid is the process identifier. Another approach is to use the jstack tool, which prints thread dumps to the command line console using this command: jstack <pid>. Repeated thread dumps can be output to a file by using the console output redirect/append directive: jstack <pid>>>threaddumps.log.

The thread dump can provide various types of information for each thread, such as a thread name which is associated with a Thread Id (tid), a thread type (e.g., whether a thread is running in the background), a thread priority, a native Thread ID (nid), a Thread State and detail such as a current blocking condition, and information on heap memory utilization. Another source of information from the thread dump is the thread stack trace. The thread stack trace can be provided as a textual output of lines which are read in an order starting from the bottom. For example, consider this partial output:

(11) org.apache.xerces.parsers.XMLParser.parse(Unknown Source)

(10) org.apache.xerces.parsers.DOMParser.parse(Unknown Source)

(9) javax.xml.ws.Service.<init>(Servicejava)

(8) javax.xml.ws.Service.create(Servicejava)

(7) org.jboss.ws.core.jaxws.client.ServiceObjectFactoryJAXWS.getObjectInstance (ServiceObjectFactoryJAXWS.java)

(6) orgjboss.ejb3.pool.ThreadLocalPool.get(ThreadLocalPool.java)

(5) org.jboss.wsf.stack.jbws.RequestHandlerImpl.handleHttpRequest(RequestHandlerImpl.java)

(4) org.jboss.wsf.common.servlet.AbstractEndPointServlet.service(AbstractEndPointServlet.java)

(3) javax.servlet.http.HttpServlet.service(HttpServlet.java)

(2) org.apache.tomcat.util.net.JIoEndPoint$Worker.run (JIoEndpoint.java)

(1) java.lang.Thread.run(Thread.java).

At line (1), Thread.run begins the execution of code in the current thread. This method is part of the java.lang package, which provides classes that are fundamental to the design of the JAVA programming language.

Line (2) indicates that the originator of the thread is a JBoss APACHE Tomcat Web container. This example uses a JBoss 5 production environment. JBoss, or JavaBeans Open Source Software Application Server, is an application server that implements the JAVA Platform, Enterprise Edition (JAVA EE). A web container (also known as a servlet container) is the component of a web server that interacts with JAVA servlets. A web container manages the lifecycle of servlets, mapping a URL to a particular servlet and ensuring that the URL requester has the correct access rights. APACHE(R) Tomcat is an open source web container. Class JIoEndpoint handles incoming TCP connections and implements a simple server model where one listener thread accepts on a socket and creates a new worker thread for each incoming connection.

Lines (3)-(5) indicate that a call to a web service is being made. Class javax.servlet.http.HttpServlet is an abstract class used for writing HTTP servlets and handling the HTTP protocol. In line (4), AbstractEndPointServlet extends HttpServlet and is a cross stack web service endpoint servlet. In line (5), class RequestHandlerImpl implements RequestHandler with mapping of snmp get/set requests to JMX mbean attribute gets/sets. Line (6) indicates that JBoss requires a Bean from its EJB3 pool. Line (7) indicates that JBoss attempts to get a JAXWS Service instance from its pool. ServiceObjectFactoryJAXWS reconstructs a javax.xml.ws.Service for a given Web Services Description Language (WSDL) when the web service client does a JAVA Naming and Directory Interface (JNDI lookup). Lines (8) and (9) indicate that JBoss creates a new JAXWS Service instance. Line (10) and (11) indicate that the creation of the new JAXWS instance triggers an XML parsing operation. DOMParser can parse an XML or HTML source stored in a string into a Document Object Model (DOM) Document. Class XmlParser is a helper class for parsing XML into a tree of node instances.

Thus, each line of the thread stack trace identifies methods which are invoked and a sequence in which they are invoked to allow a data structure of a hierarchy of invoked methods to be created such as in FIGS. 10D to 10F and 10L. Further, the attributes of the invoked methods can be obtain from the thread stack trace and/or from another source such as an agent to provide a data structure of a detected hierarchy of attributes such as in FIG. 10H.

The attributes can represent any characteristics of the code. For example, the attributes of invoked methods can indicate whether the invoked methods are at least one of: an HTTP servlet, an EJB, a method in a class which is an EJB stub, a method executing asynchronously, a method connected with parameters of an HTTP request, a factory method (a design pattern that lets a class defer instantiation to subclasses), a queue interface or a singleton (the singleton pattern is a design pattern that restricts the instantiation of a class to one object). Generally, applications are built using patterns of attributes. An example pattern involves an HTTP servlet that calls an EJB. The reference patterns can be developed to specify certain patterns of attributes of an application which are of interest.

Another example pattern involves a queuing mechanism inside an application. For example, assume a request component of a Thread A is stored in any container. A Thread B iterates on that container and processes the elements according to the FIFO (first in, first out) principle. After the processing of Thread B, Thread A gets notified with a processing result. In this pattern, we have the importance of the Thread name (ownership). A container on Thread B can be presented by using the Java Collections framework (JCF, a set of classes and interfaces that implement commonly reusable collection data structures). An object with the identical request attributes shared by both threads matches the pattern.

As another example, calls of an application that are channeled through the HttpServlet.service method (line (3) of the above thread stack trace) indicate that the application uses J2EE and servlets.

Moreover, new reference patterns can be configured (e.g., generated) or extended based on results which are obtained from the sampling of the stack. For example, an attribute pattern which is frequently detected can be used as a reference pattern.

Generally, the techniques provided herein can encompass any type of design pattern in software engineering. Design patterns are re-usable elements of object-oriented software design. Various type of design patterns include creational, structural and behavioral design patterns Creational patterns are used to create objects for the designer, rather than having the designer instantiate objects directly. This gives a program more flexibility in deciding which objects need to be created for a given case. Example creational patterns include the following. The Abstract Factory pattern groups object factories that have a common theme. The Builder pattern constructs complex objects by separating construction and representation. The Factory Method pattern creates objects without specifying the exact class to create. The Prototype pattern creates objects by cloning an existing object. The Singleton pattern restricts object creation for a class to only one instance.

Structural patterns concern class and object composition. They use inheritance to compose interfaces and define ways to compose objects to obtain new functionality. Example structural patterns include the following. The Adapter pattern allows classes with incompatible interfaces to work together by wrapping its own interface around that of an already existing class. The Bridge pattern decouples an abstraction from its implementation so that the two can vary independently. The Composite pattern composes zero-or-more similar objects so that they can be manipulated as one object. The Decorator pattern dynamically adds/overrides behavior in an existing method of an object. The Facade pattern provides a simplified interface to a large body of code. The Flyweight pattern reduces the cost of creating and manipulating a large number of similar objects. The Proxy pattern provides a placeholder for another object to control access, reduce cost, and reduce complexity.

Behavioral patterns are mainly concerned with communication between objects. Example behavioral patterns include the following. The Chain of responsibility pattern delegates commands to a chain of processing objects. The Command pattern creates objects which encapsulate actions and parameters. The Interpreter pattern implements a specialized language. The Iterator pattern accesses the elements of an object sequentially without exposing its underlying representation. The Mediator pattern allows loose coupling between classes by being the only class that has detailed knowledge of their methods. The Memento pattern provides the ability to restore an object to its previous state (undo). The Observer pattern is a publish/subscribe pattern which allows a number of observer objects to see an event. The State pattern allows an object to alter its behavior when its internal state changes. The Strategy pattern allows one of a family of algorithms to be selected on-the-fly at runtime. The Template method pattern defines the skeleton of an algorithm as an abstract class, allowing its subclasses to provide concrete behavior. The Visitor pattern separates an algorithm from an object structure by moving the hierarchy of methods into one object.

These and other patterns are candidates that the designer can use as reference patterns.

The functionality described herein may be implemented using hardware, software or a combination of both hardware and software. For software, one or more non-transitory, tangible processor readable storage devices or apparatuses having processor readable code embodied thereon for programming one or more processors may be used. The non-transitory, tangible processor readable storage devices can include computer readable media such as volatile and non-volatile media, removable and non-removable media.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
   identifying a hierarchy of invoked methods of an application, the methods are not instrumented and the identifying the hierarchy comprises sampling a stack of the application at multiple sampling times, providing thread stack traces based on the sampling which identify executing code in a textual output of lines, and reading the textual output of lines to identify the invoked methods;
   identifying attributes of the invoked methods, the identifying the attributes comprises reading the textual output of lines;
   generating a data structure representing a hierarchy of the attributes of the invoked methods according to the hierarchy of the invoked methods, the generating comprises aggregating the attributes of the invoked methods over the multiple sampling times to provide an aggregated hierarchy which represents the attributes and an order in which the attributes are used in the application;
   comparing the data structure representing the hierarchy of the attributes of the invoked methods to a reference data structure, the reference data structure representing a reference hierarchy of attributes;
   based on the comparing, identifying a match between the reference data structure and a subset of attributes of the hierarchy of the attributes of the invoked methods, the subset of attributes is associated with a subset of the invoked methods; and
   in response to the identifying the match, instrumenting the subset of the invoked methods.

2. The method of claim 1, wherein:
   the match is identified when the subset of attributes occur in a sequence which matches a sequence of attributes in the reference data structure.

3. The method of claim 1, further comprising:
   determining that a frequency of occurrence of the match exceeds a minimum frequency, the instrumenting the subset of the invoked methods occurs in response to the determining that the frequency of occurrence of the match exceeds the minimum frequency.

4. The method of claim 1, further comprising:
   in response to the identifying the match, determining a type of the instrumentation, the instrumenting the subset of the invoked methods is responsive to the determining the type of the instrumentation.

5. The method of claim 1, wherein:
   the identifying of the attributes of the invoked methods comprises providing a request with a name of a method to an agent; and
   the agent accesses a class hierarchy using an instrumentation Application Programming Interface to look up one or more superclasses of the method.

6. The method of claim 1, further comprising:
   at least one of configuring or extending the reference data structure based on the match.

7. The method of claim 1, wherein:
   the hierarchy of the attributes of the invoked methods comprises a hierarchy of classes of the invoked methods.

8. The method of claim 1, further comprising:
   determining that an overhead cost of instrumenting the subset of attributes is below a threshold cost, the instrumenting the subset of the invoked methods is responsive to the determining that the overhead cost of instrumenting the subset of attributes is below the threshold cost.

9. The method of claim 1, wherein:
   the attributes of the invoked methods indicate whether the invoked methods comprise a method in a class which is an EJB stub.

10. The method of claim 1, wherein:
    the textual output of lines identify the attributes by indicating whether the invoked methods comprise a Hyper Text Transport Protocol (HTTP) servlet and an Enterprise JAVA Bean (EJB).

11. The method of claim 1, wherein:
    the reference data structure comprises a wildcard node which indicates that a method with one attribute indirectly calls a method with another attribute and that there are one or more intermediate attributes between the one attribute and the another attribute in the reference data structure.

12. The method of claim 1, wherein:
the attributes of the invoked methods indicate whether the invoked methods comprise a factory method.

13. The method of claim 1, wherein:
the attributes of the invoked methods indicate whether the invoked methods comprise at least one of a queue interface or a singleton.

14. The method of claim 1, wherein:
the attributes of the invoked methods indicate whether the invoked methods comprise a method executing asynchronously.

15. A system, comprising:
a storage device; and
a processor in communication with the storage device, the processor programmed to:
   identify invoked methods of an application by repeatedly sampling a stack of the application, provide a log based on the sampling which identifies executing code in a textual output of lines, and the methods are uninstrumented;
   provide the log to a server, the log identifies hierarchies of the invoked methods;
   receive a request from the server to identify one or more superclasses of an invoked method of the hierarchies of the invoked methods;
   in response to the request, access a class hierarchy using an Application Programming Interface to look up the one or more superclasses and provide the one or more superclasses to the server; and
   receive a request from the server to instrument the invoked method of the hierarchies of the invoked methods.

16. The system of claim 15, wherein:
the request from the server to instrument the invoked method indicates a type of the instrumentation.

17. A computer program product, comprising:
a memory having computer readable program code embodied therewith, the computer readable program code comprising:
   computer readable program code configured to identify a hierarchy of invoked methods of an application, the methods are not instrumented and the identifying of the hierarchy comprises sampling a stack of the application at multiple sampling times;
   computer readable program code configured to identify attributes of the invoked methods;
   computer readable program code configured to generate a data structure representing a hierarchy of the attributes of the invoked methods, according to the hierarchy of the invoked methods, by aggregating the attributes of the invoked methods over the multiple sampling times, the hierarchy represents the attributes and an order in which the attributes are used in the application;
   computer readable program code configured to identify a match between a reference data structure and a subset of attributes of the hierarchy of the attributes of the invoked methods, the subset of attributes is associated with a subset of the invoked methods; and
   computer readable program code configured to provide a request to instrument the subset of the invoked methods in response to the computer readable program code configured to identify the match.

18. The computer program product of claim 17, further comprising:
computer readable program code configured to determine a type of instrumentation in response to the computer readable program code configured to identify the match, the computer readable program code configured to provide the request to instrument the subset of the invoked methods is responsive to the computer readable program code configured to determine the type of the instrumentation.

19. The computer program product of claim 17, wherein:
the match is identified when the subset of attributes occur in a sequence which matches a sequence of attributes in the reference data structure.

20. The computer program product of claim 17, wherein:
the computer readable program code configured to identify the match determines that the match occurs with a minimum frequency.

* * * * *